United States Patent
Sonntag et al.

(10) Patent No.: US 11,539,536 B2
(45) Date of Patent: Dec. 27, 2022

(54) PHYSICALLY UNCLONABLE FUNCTION WITH PRECHARGE THROUGH BIT LINES

(71) Applicant: Silicon Laboratories Inc., Austin, TX (US)

(72) Inventors: Jeffrey L. Sonntag, Austin, TX (US); Hatem M. Osman, Austin, TX (US); Gang Yuan, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 0 days.

(21) Appl. No.: 16/850,606

(22) Filed: Apr. 16, 2020

(65) Prior Publication Data
US 2021/0328817 A1    Oct. 21, 2021

(51) Int. Cl.
| | |
|---|---|
| H04L 9/32 | (2006.01) |
| G11C 7/12 | (2006.01) |
| G11C 7/10 | (2006.01) |
| H03M 1/66 | (2006.01) |
| G11C 11/412 | (2006.01) |
| G11C 5/14 | (2006.01) |
| G11C 11/419 | (2006.01) |

(52) U.S. Cl.
CPC ............ *H04L 9/3278* (2013.01); *G11C 5/147* (2013.01); *G11C 7/1078* (2013.01); *G11C 7/12* (2013.01); *G11C 11/412* (2013.01); *G11C 11/419* (2013.01); *H03M 1/66* (2013.01)

(58) Field of Classification Search
None
See application file for complete search history.

(56) References Cited

U.S. PATENT DOCUMENTS

| | | | | |
|---|---|---|---|---|
| 4,910,714 A | * | 3/1990 | Hartgring | G11C 7/062 365/208 |
| 7,961,132 B1 | * | 6/2011 | Perry | H03M 1/0607 341/172 |
| 8,536,898 B2 | | 9/2013 | Rennie et al. | |

(Continued)

OTHER PUBLICATIONS

Bhargava, M., "Attack Resistant Sense Amplifier Based PUFs (SA-PUF) with Deterministic and Controllable Reliability of PUF Responses," IEEE, 2010, pp. 106-111.

(Continued)

*Primary Examiner* — Alexander H Taningco
*Assistant Examiner* — James H Cho
(74) *Attorney, Agent, or Firm* — Zagorin Cave LLP

(57) ABSTRACT

A physically unclonable function (PUF) includes a bit cell that includes a latch and a switch to selectively couple the latch to a supply voltage node. A first transmission gate couples a first bit line to a first internal node of the latch and a second transmission gate couples a second bit line to a second internal node of the latch. A digital to analog converter (DAC) circuit is selectively coupled to the first internal node through the first bit line and the first transmission gate and to the second internal node through the second bit line and the second transmission gate, to thereby precharge the latch before the first bit cell is read. The latch regenerates responsive to the switch being closed to connect the latch to the supply voltage node. The first and second bit lines are used to read the regenerated value of the latch.

19 Claims, 10 Drawing Sheets

(56) References Cited

U.S. PATENT DOCUMENTS

| | | | | |
|---|---|---|---|---|
| 8,934,312 | B2* | 1/2015 | Chu | G11C 29/50 365/201 |
| 9,279,850 | B1 | 3/2016 | Pedersen | |
| 2015/0055417 | A1 | 2/2015 | Kim et al. | |
| 2017/0048072 | A1 | 2/2017 | Cambou | |
| 2018/0176012 | A1 | 6/2018 | Hung et al. | |
| 2019/0342106 | A1* | 11/2019 | Li | H04L 9/3278 |
| 2020/0020364 | A1* | 1/2020 | Tsai | G11C 7/08 |
| 2020/0243122 | A1* | 7/2020 | Mahatme | G11C 29/021 |

OTHER PUBLICATIONS

Claes, M., et al., "Comparison of SRAM and FF PUF in 65nm Technology," Information Security Technology for Applications, NordSec 2011, 18 pages.

Eiroa, S., et al., "Reducing Bit Flipping Problems in SRAM Physical Unclonable Functions for Chip Identification," IEEE International Conference on Electronics, Circuits, and Systems, 2012, pp. 1-4.

Gassend, B., "Physical Random Functions," Master Thesis, Feb. 2003, Computer Science and Artificial Intelligence Laboratory, Massachusetts Institute of Technology, 91 pages.

Holcomb, D., et al., "Power-up SRAM State as an Identifying Fingerprint and Source of True Random Numbers," IEEE Transactions on Computers, vol. 57, No. 11, Nov. 2008, pp. 1-14.

Maes, R., "Physically Unclonable Functions: Constructions, Properties and Applications," Dissertation, Aug. 2012, Arenberg Doctoral School of Science, Engineering & Technology, 260 pages.

Bhargava, M., "Reliable, Secure, Efficient Physical Unclonable Functions," Carnegie Mellon University, Dissertations, Paper 238, May 2013, 157 pages.

Schinianakis, D., "Lightweight Security for the Internet of Things: A Soft Introduciton to Physical Unclonable Functions," IEEE Potentials, Mar./Apr. 2019, pp. 21-28.

* cited by examiner

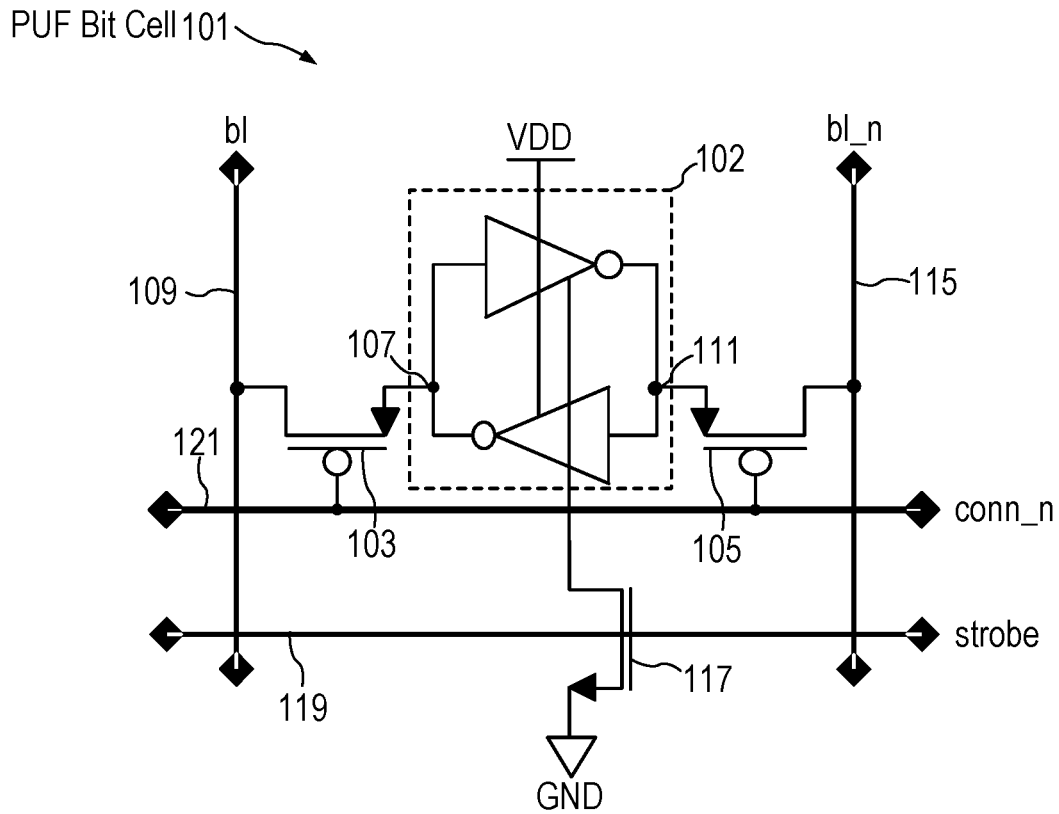
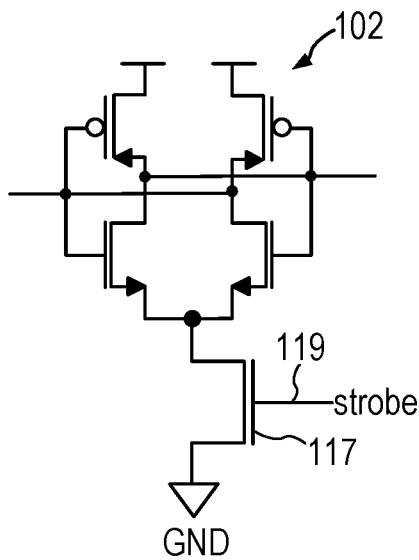 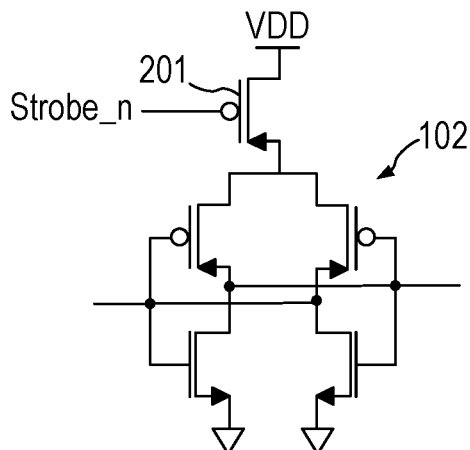
Fig. 1
Fig. 2A    Fig. 2B

PHYSICALLY UNCLONABLE FUNCTION WITH PRECHARGE THROUGH BIT LINES

CROSS-REFERENCE TO RELATED APPLICATION(S)

This application relates to U.S. patent application Ser. No. 16/850,615, filed Apr. 16, 2020, entitled "Survey Mechanism for a Physically Unclonable Function", naming Jeffrey L. Sonntag as inventor, which application is incorporated herein by reference.

BACKGROUND

Field of the Invention

The present disclosure relates to physically unclonable functions (PUFs) in which reliability of PUF bits can be effectively assessed.

Description of the Related Art

A Physical Unclonable Function (PUF) is a random behavior of a circuit that generates random bits. The random behavior ensures that the random bits generated are different across seemingly identical integrated circuits. The PUF is used for security applications such as encryption keys.

There are many approaches to make PUF bit cells. One such approach is a cell based on the SRAM bit cell, which has a low area compared to other PUF approaches such as ring oscillators. A significant problem of the SRAM PUF bit cell is that the natural error rates after changes in voltage (V), temperature (T), and Aging are as high as 15 percent, requiring extremely expensive (area, time, power) coding to reconstruct with reduced errors.

Prior art solutions to reduce errors include determining whether repeated reads of a bit produce the same value. That allows selecting for use only those bits with a voltage offset larger than ~2×RMS(Vnoise). But the noise voltage is typically much smaller than voltage, temperature, aging (VTA) induced changes in trip point, so bits with fairly small trip points are still included. That results in a quite limited reduction in error rate. Also, assuming Gaussian distributions for noise and initial offset, and nonzero bias in the bit cell's statistics, this procedure makes the bias worse.

It would be desirable to have a low-area-overhead circuit that allows assessing the reliability of PUF bits in an array.

SUMMARY OF EMBODIMENTS OF THE INVENTION

In one embodiment, a physically unclonable function (PUF) includes a first bit cell. The first bit cell includes a latch, a switch to selectively couple the latch to a supply voltage node, a first transmission gate coupled between a first bit line and a first internal node of the latch and a second transmission gate coupled between a second bit line and a second internal node of the latch. A digital to analog converter (DAC) circuit is selectively coupled to the first internal node through the first bit line and the first transmission gate and to the second internal node through the second bit line and the second transmission gate, to thereby precharge the latch before the first bit cell is read. The first and second internal nodes are respectively coupled to the first and second bit lines to read a value of the latch.

In another embodiment a method includes decoupling a latch in a bit cell of a physically unclonable function (PUF) from a supply voltage node. The method further includes coupling a first output of a digital to analog converter (DAC) circuit to a first internal node in the bit cell through a first bit line and a first transmission gate and coupling a second output of the DAC circuit to a second internal node in the bit cell through a second bit line and a second transmission gate. After a settling time, the first and second bit lines are disconnected from the first and second internal nodes. The first bit line and the second bit line are precharged to a predetermined voltage level. The latch is coupled to the supply voltage node to cause the bit cell to regenerate and a value of the latch is read using at least one of the first and second bit lines.

In another embodiment a method includes precharging a latch in a bit cell of a physically unclonable function (PUF) using a differential voltage applied to first and second bit lines. After precharging the latch, causing the latch to regenerate and then reading the value of the latch using at least one of the first and second bit lines.

BRIEF DESCRIPTION OF THE DRAWINGS

The present invention may be better understood, and its numerous objects, features, and advantages made apparent to those skilled in the art by referencing the accompanying drawings.

FIG. 1 illustrates an embodiment of a PUF bit cell.

FIG. 2A illustrates the four transistors of the two inverters in the PUF bit cell and an NMOS switch between common source and actual ground.

FIG. 2B illustrates the four transistors of the two inverters in the PUF bit cell and PMOS switch between common source and VDD.

The use of the same reference symbols in different drawings indicates similar or identical items.

DETAILED DESCRIPTION

Figure 3:
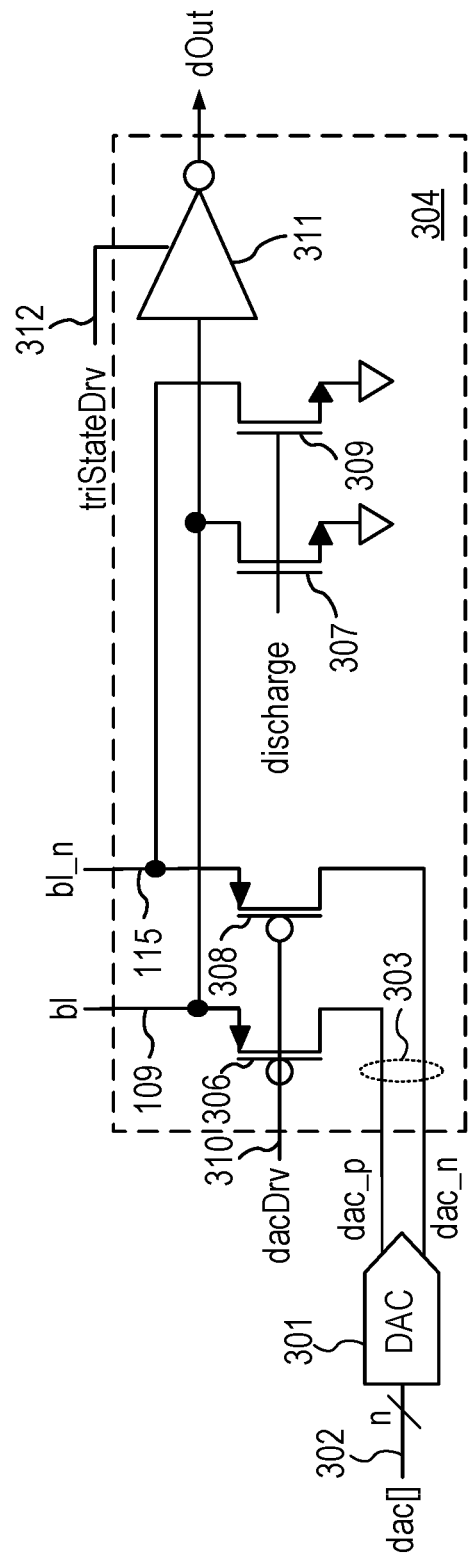
FIG. 3 illustrates an embodiment that includes a differential digital to analog converter (DAC) suppling a differential analog bus pair to a bit line termination circuit.

By assessing the reliability of individual PUF bits, unreliable bits are excluded from further use, significantly improving the bit error rate (BER). The assessment approach evaluates offsets of the bit cells in an analog PUF, and selects for use those bit cells that have large positive or negative natural offsets thereby significantly reducing the error rate. In other words, those bit cells with a large positive or negative offsets will be far less likely to change in response to drift as explained further herein. An embodiment of a bit cell described herein to allow such assessment is a less complex circuit with a lower bit cell area than prior art approaches. In an embodiment, the bit cell described herein allows an offset to be applied before reading the bit cell to determine if the bit cell regenerates to a 1 or 0. That allows strong 1s and 0s to be selected thereby reducing the error rate associated with more traditional PUF approaches.

FIG. 1 illustrates a PUF bit cell 101 according to an embodiment. The PUF bit cell includes a 6 transistor (6T) SRAM bit cell. The 6T cell includes a latch 102 formed by two inverters and two transmission gates 103 and 105. The four transistors of the two inverters are shown in FIG. 2A. The transmission gate 103 couples the bit cell internal node 107 to the bit line 109. The transmission gate 105 couples the internal node 111 to bit line 115. The PUF cell 101 also includes an NMOS switch 117 between common source (the inverters ground) and actual ground (GND). When the strobe signal 119 is asserted the inverters are coupled to actual ground and the latch regenerates to a 1 or 0.

While the PUF bit cell 101 has been drawn with a single NMOS transistor between the inverters' ground and actual GND, another embodiment shown in FIG. 2B replaces the single NMOS transistor 117 with a single PMOS transistor 201 between the inverters' VDD and the actual VDD. Note also that in another embodiment, the PMOS transmission gates 103 and 105 are replaced with NMOS devices to couple the internal nodes 107 and 111 to their respective bit lines. In an embodiment, the PMOS transmission gates are used to ensure that the NMOS offset (larger in some process technologies) dominates as the NMOS devices within the inverters begin regenerating first.

FIG. 3 illustrates an embodiment that includes a differential digital to analog converter (DAC) 301 receiving a digital control signal 302 and supplying differential analog bus pair 303 (dac_p and dac_n) to a bit line termination circuit 304. The positive DAC signal dac_p couples to the bit line 109 through transistor switch 306. The negative DAC signal dac_n couples to bit line 115 through transistor switch 308. In an embodiment multiple independently controllable DACs are used to generate the differential analog signals that couple to the bit lines. The bit line terminal circuit 304 includes two transistor switches 307 and 309 that couple the bit lines 109 and 115 to discharge the bit lines to ground as explained further herein. Finally, a tristate driver 311 receives bit line 109 (or bit line 115 in another embodiment) and drives the selected PUF bit logic state to a common data out bus. While a tristate driver is shown, other circuits may be used to couple the PUF bit logic state to the data bus, e.g., a transmission gate, or a multiplexer circuit to select from different banks of the PUF array.

Figure 4:
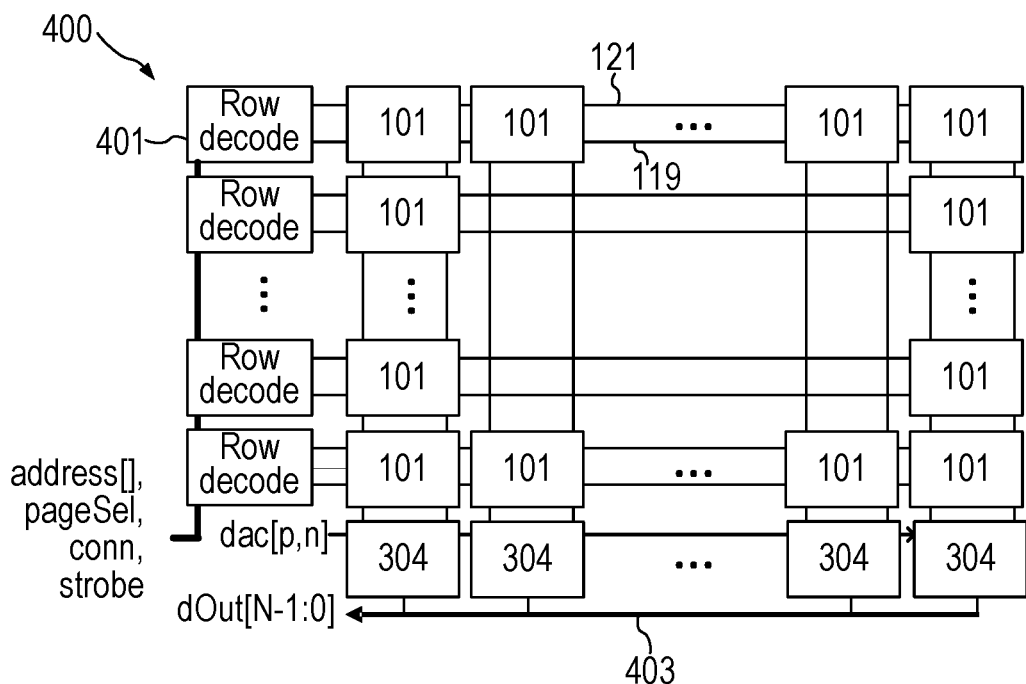
FIG. 4 shows an embodiment in which an array of PUF bit cells are arranged in a PUF page.

FIG. 4 shows an array of PUF bit cells 101 arranged in a PUF page 400. A row decoder 401 for each row of the page 400 receives an address, a page select, conn signal, and strobe and supplies a conn_n signal 121 to turn on the transmission gates when that row is selected and a strobe signal 119 to cause the PUF bit cells to regenerate on assertion (see FIG. 1). In addition, a plurality of bit line termination circuits 304 terminate the bit lines of each column of the PUF page 400. The DAC differential signals are coupled to all of the bit lines of each column of the page. Finally, a data out bus dOut[N−1:0] 403 receives the latch values of the PUF bit cells that were read and supplied by the tristate driver of each bit line termination circuit. The page size is determined based on a desired PUF array speed. A larger page size can result in a slower PUF array.

Figure 5:
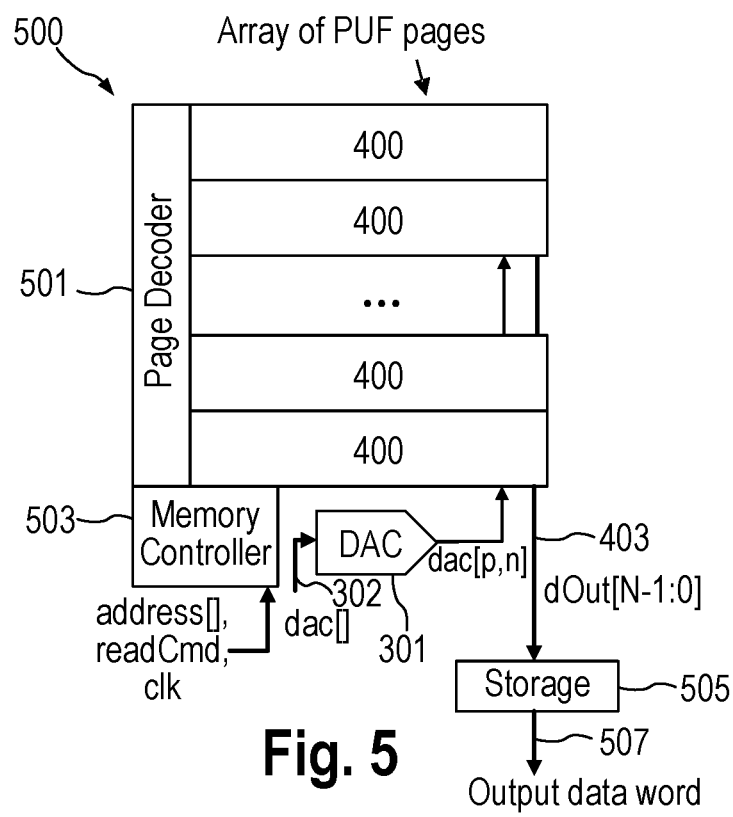
FIG. 5 shows an array formed of PUF pages.

FIG. 5 shows an array 500 formed of PUF pages 400. A page decoder 501 selects particular pages of the array 500 and a memory controller 503 controls access to the array of pages. The memory controller receives a memory address, a read command, and a clock and controls access to precharge and read the PUF bit cells as described further herein. FIG. 5 also shows the DAC 301 coupled to drive the bit lines of the array 500 and the data out bus 403 coupled to receive the data read from the array 500 and storage elements 505, e.g., flip-flops, that store the data read from the array and supply the output data word. In an embodiment the array size is between 4K and 8K PUF bits.

Figure 6:
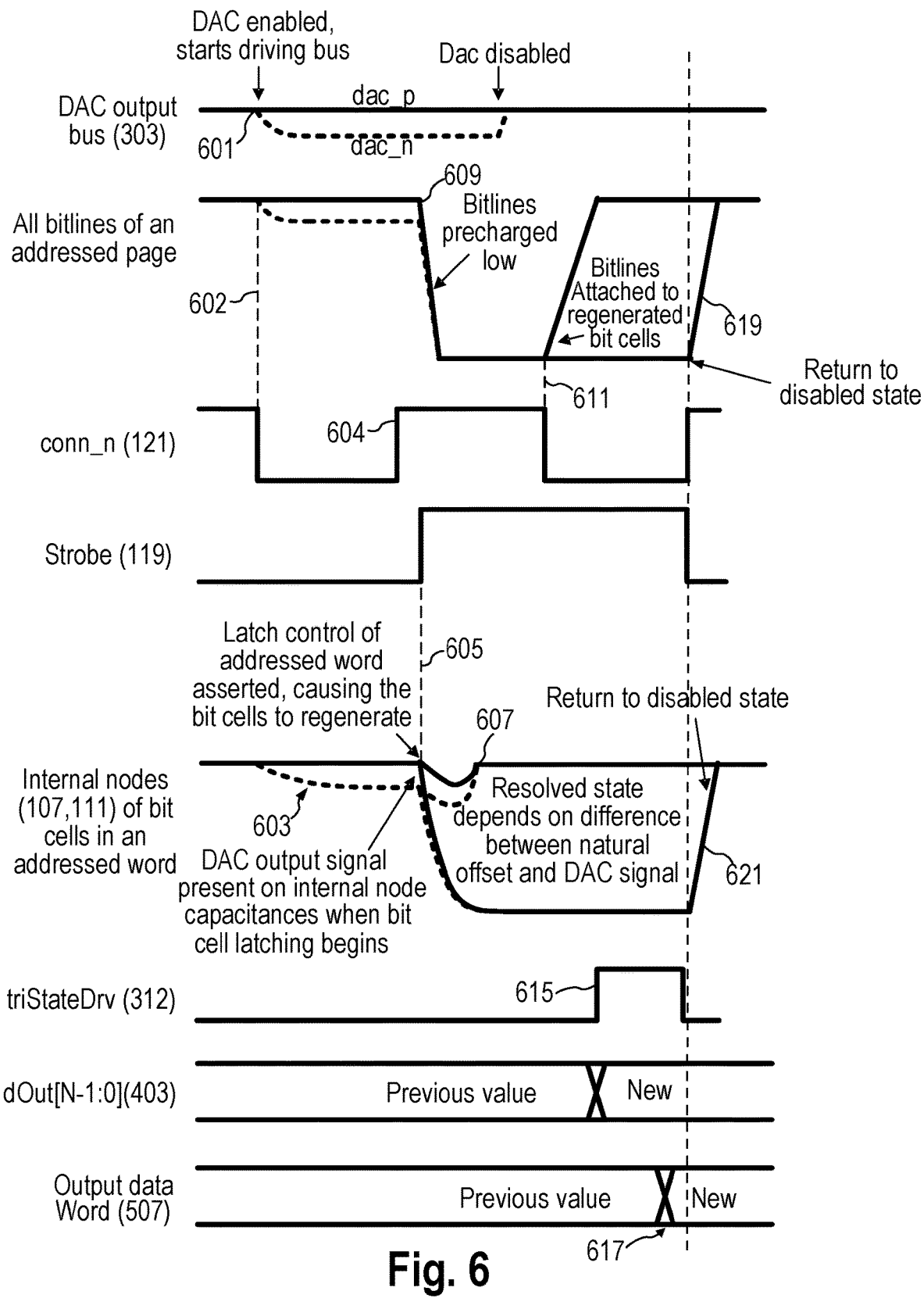
FIG. 6 shows a timing diagram that illustrates applying an offset to a PUF bit cell and then reading the bit cell.

FIG. 6 shows a timing diagram that illustrates a read operation that applies an offset to a PUF bit cell to precharge the PUF bit cell and then reads the contents of the bit cell. Unlike prior approaches, the PUF bit cell allows use of bit lines to both make the analog input connection to apply the offset to the bit cell and uses the same bit lines for the digital output connection to read the contents of the bit cell. Control logic in the memory controller controls the operation to insert the offset and then read the bit cells. The control logic, or portions thereof reside in the memory controller 503, page decoder 501, and/or the row decoders 401. With reference to FIGS. 1, 3, and 4-6, at 601 the DAC is enabled and starts driving the differential DAC output to the differential bus pair 303. In addressed pages, the bit line termination circuits 304 connect the differential analog signal to the bit lines through transistor switches 306 and 308. At the same time at 602, the conn_n signal 121, which is active low, is asserted to cause pass transistors 103 and 105 in each bit cell in the addressed word to connect to the bit-lines, which currently have the analog signal to precharge the bit cells. During the application of the offset voltage to precharge the bit cells, the strobe signal 119 remains deasserted thereby decoupling the latch from one of the power supply nodes. The control logic allows time to settle the analog voltage in each bit cell of the addressed word. As shown at 603, the internal nodes 107 and 111 of the bit cells in an addressed word follow the differential voltage on the bit lines. After settling, the control logic disconnects the bit lines from the bit cells by deasserting the conn_n signal 121 (signal goes high) at 604 and deasserts the dacDrv signal 310 (not shown in FIG. 6) to disconnect the bit-lines from the global DAC output bus by turning off switches 306 and 308 in each bit line termination circuit 304. At 605 the control logic asserts strobe 119 to fire the latch, causing positive feedback to force each addressed bit cell to a "1" or "0" state and allow time for full regeneration. The latch has resolved around time 607 to either a 1 or 0. The resolved state depends on the difference between the natural offset and the offset introduced by the DAC differential signal during precharge.

At the same time as the time of firing the latch the control logic at 609 causes the bit lines to be precharged to the appropriate voltage depending on whether bit-cell's pass-gate transistors are PMOS or NMOS. As shown, in FIG. 6, with PMOS pass gate transistors, the bit lines are precharged low by enabling the discharge switches 307 and 309. In an embodiment with NMOS pass transistors, the bit lines are precharged high. After sufficient time to precharge the bit lines low, the precharging of the bit lines stops and the control logic asserts conn_n 121 on the addressed word to reconnect the bit-cell regenerated internal nodes to the bit-lines at 611. The control logic waits for the bit-lines to settle. The control logic asserts the tristate driver 311 (triStateDrv) at 615 to send read data to the dOut [N−1:0] bus and then clocks output data flip-flops (or latches) to hold resulting output word with the new output data word at 617. After the read operation, the bit lines and the internal nodes of the bit cell return to a disabled state at 619 and 621 respectively. In the disabled state the latch is disconnected from the power supply, the transmission gates are on, and both bit lines set at a preselected logic level. In the embodiment illustrated by FIG. 6, the preselected logic level is high voltage level. In the embodiment of FIG. 6, the bitlines and the DAC output are high during idle, reflecting an embodiment in which the bit cells having an NMOS ground switch and PMOS transmission gates as shown in FIG. 1. In that case, holding the bitlines (and the internal nodes) high when the bit cell is disabled ensures that there is no current flowing in the bit cell and no differential voltages across any of the matching devices. That eliminates most mechanisms for aging induced drift of the underlying or natural offset voltages of the bit cells.

Thus, an SRAM type PUF has been described in which a digitally controlled analog signal (via a DAC) adds an offset to each of the PUF bit cells during a read operation. On-chip hardware is used to determine how many strong "1" or "0" results are obtained (from a preselected portion of the entire PUF or the entire PUF) as a result of choosing a particular digital offset setting. Such an operation is termed "surveying". It is beneficial for security reasons that this surveying operation be done by hardware. Of course, embodiments can utilize software for the surveying operation with the caveat that certain security weaknesses are exposed. Hardware and/or software controls surveying operations in order to select two thresholds which result in the number of strong "1s" and the number of strong "0s" being both: (1) similar and (2) approximately matching some preselected number. It is beneficial for security reasons, that the number of strong 1s and the number of strong 0s be similar. Note that in the context of the SRAM type PUF shown in FIG. 1, the threshold values are the offsets supplied by the DAC at the start of a read operation to precharge the bit cell.

Before describing aspects of the surveying approach some terminology will be defined. Bias in supposedly random binary data means that $p(1) \sim = p(0)$. Bias is generally defined as: bias=$p_1$−0.5. Nonzero bias in PUF contents has been shown to reduce the entropy (make it easier to guess), especially when combined with long repetition codes. One use for PUF contents is for root keys and security oriented customers take a dim view of root keys being easy to guess.

Figure 7:
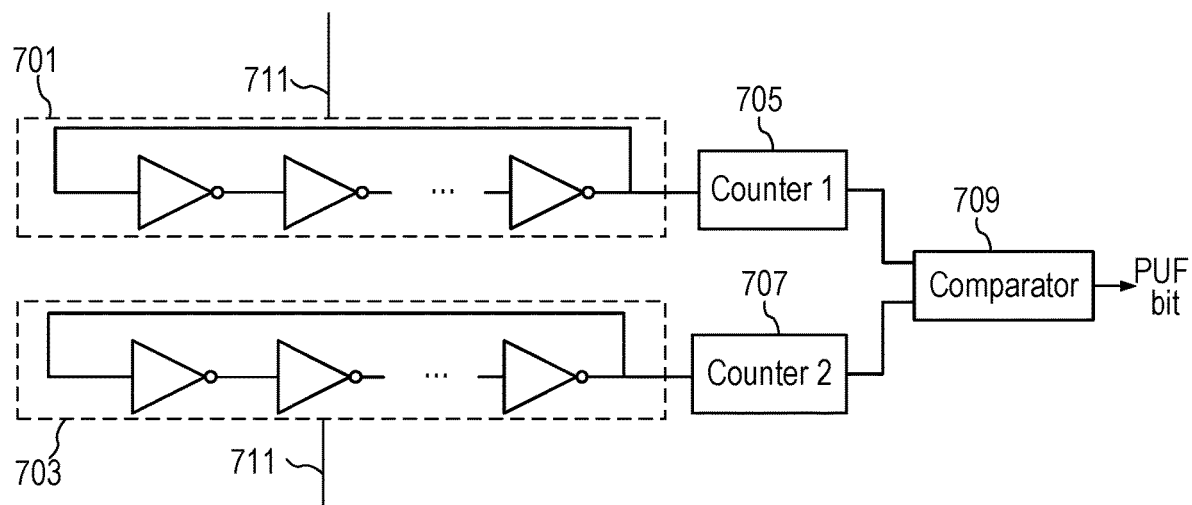
FIG. 7 shows a high level block diagram of a ring oscillator based PUF.

The term "analog PUF" describes a PUF in which digital control, e.g., a multibit digital control word, is used to adjust the likelihood of getting binary ones as the result of reading an addressed word of bit cells in the PUF. The details of the PUF implementation need not match the PUF bit cell described in FIG. 1. Instead, the term requires that the digital control can be used to make ones more likely (in one direction of the control) or less likely (in the other direction). For example, FIG. 7 shows a ring oscillator based PUF. Two ring oscillators 701 and 703 oscillate with different frequencies counted by counters 705 and 707, which are compared in comparator 709, which supplies the PUF bit. In a ring oscillator based PUF, the random variable is the ratio of the frequencies of the two oscillators. The comparator output takes on a random value for seemingly identical oscillators. In a simple implementation, the counters have a number of bits, N, and the comparator function is based on one of the N bits in one counter flipping to or from the reset state before the same bit in the other counter flips. Other implementations for ring oscillator based PUFs are known. Note that while two ring oscillators are shown, embodiments may have, e.g., 256 ring oscillators, of which two are chosen for comparison. The frequency of the oscillation can be biased higher or lower through bias controls 711. In embodiments, analog or digital control of a varactor loading the oscillator, or the bias current or voltage feeding the supplies of the oscillators is used to raise or lower the oscillation frequencies. For example, if the ring oscillators were current limited (ICOs) each having their own current source feeding their local supply voltage, a current mode DAC which steered a very small amount of current to one supply or the other would be an effective way to adjust the ratio of frequencies.

Post-silicon selection (PSS) refers to selecting for use only those bits which (during enrollment) are determined to be "strong" (i.e., less likely to flip polarity with drift than "weak" bits). Selection information is combined with the helper data to allow the reconstruction algorithm to skip over the weak bits.

An array of PUF bit cells is part of the system required to allow the reliable recreation of a secure root key. Additional parts of the system include enrollment hardware and/or software. Enrollment refers to the generation of "helper data" (generally stored in flash memory), which is used during reconstruction. Enrollment is typically done just once, during product test of a secure system. Enrollment may use the random polarity of a subset of some of the PUF bits to generate the entropy needed in the root key, or may use the output of a true random number generator (TRNG).

Reconstruction refers to the reliable recreation of a set of bits (generally referred to as a root key) using the PUF contents and the helper data. Reconstruction, using hardware and/or software, may optionally be done once after each power-up, after emergence from a low power state, or whenever the root key is needed.

In an array of PUF bit cells, each cell has an underlying or natural offset $V_{os}$, which may vary somewhat (drift) with changes in supply voltage, temperature, and aging. When read, the binary result depends on: sign ($V_{os}+V_{noise}-V_{control}$). Note that while the symbol "V" is commonly used for voltage, the symbol could represent time or frequency in PUF cells based on delays or oscillators, respectively. As used herein, $V_{control}$ is the applied offset (in voltage, time, frequency, etc.) that $V_{OS}$ has to overcome to maintain the value corresponding to the underlying offset of the PUF bit cell. Note that $V_{noise}$ is generally quite small relative to the standard deviation of the offset voltages. The term "drift" represents changes in $V_{os}$ as a function of voltage, temperature, aging (VTA). Drift may be thought of as noise in a communication channel. Measured drift is generally independent from bit to bit, and has a distribution which is at least a reasonable match to Gaussian. If $V_{os}$ is sufficiently large (positive or negative), the sign of bit cell is less likely to be affected by drift. $V_{control}$ can be used to determine which bit cells have a sufficiently high $V_{os}$ and thus can be considered strong ones or strong zeros. For example, with reference to FIG. 1, $V_{control}$ is the amount of differential bias applied over the bit lines. If the underlying offset of bit cell 101 is strong enough to overcome the applied differential bias represented by $V_{control}$, the bit cell can be considered a strong 1 or a strong 0 depending on the specific $V_{control}$ applied.

In a traditional PUF implementation, there is no control ($V_{control}=0$). Ignoring noise, errors result when:

$$\frac{V_{osDrift}}{V_{oso}} < -1,$$

which implies that the offset drift ($V_{osDrift}$) is larger than the original offset ($V_{oso}$) and in the opposite direction. Therefore, error rates are dominated by bits which have offsets with small magnitudes. For SRAM PUF implementations, error rates at the worse VTA corner as high as 15-20% are seen. This high BER causes the need for extremely powerful error correction codes. These codes are expensive in the required number of PUF bits, the required size of helper data, silicon area, and reconstruction time and energy.

Figure 8:
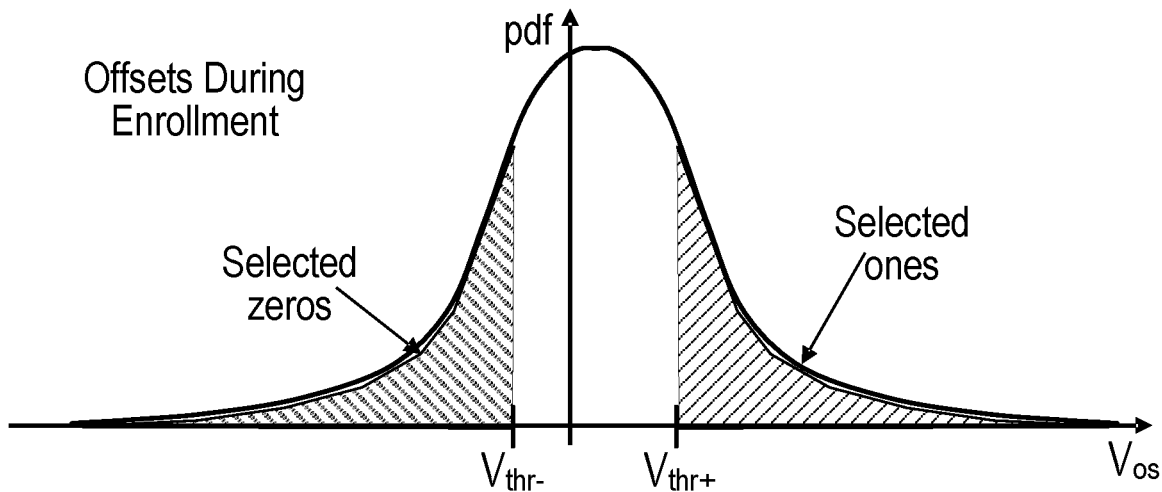
FIG. 8 illustrates the probability density function (pdf) for ones and zeros for various offset voltages ($V_{os}$).
Figure 9:
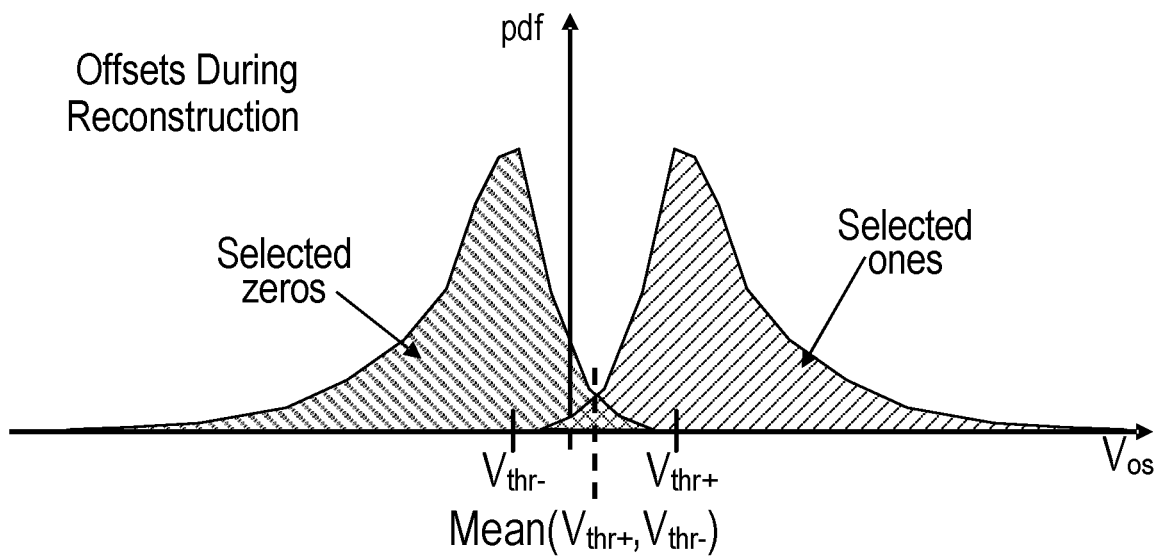
FIG. 9 illustrates using a value of offset control during reconstruction equal to a mean of the positive threshold control value and negative threshold control value to minimize errors.

FIG. 8 illustrates the probability density function (pdf) for ones and zeros for various offset voltages ($V_{os}$). Given an analog PUF, during enrollment, a set of two offset controls (positive threshold control value ($V_{thr+}$) and negative threshold control value ($V_{thr-}$)) can be chosen to allow selection of sufficiently strong (positive and negative) bits. $V_{thr+}$ represents the $V_{control}$ value used to determine strong is and $V_{thr-}$ represents the $V_{control}$ value used to determine strong 0s. If the original offset distribution is not zero mean, the bias (mismatch in the number of positive and negative selected bits) can be made small only if the chosen thresholds have different magnitudes. During reconstruction, drift may be large enough to produce errors. Referring to FIG. 9, assuming symmetry in drift, error count is minimized by using a value of offset control during reconstruction corresponding to the mean($V_{thr+}$,$V_{thr-}$).

In this context, surveying means either passive surveying: determination of the number of 1s or 0s that would be selected by the use of a particular threshold. Or in some cases it may be sufficient to simply know the polarity of the difference between the resulting number and the desired number. Active surveying refers to combining passive surveying and a search algorithm (e.g., successive approximation, approximation of Newton's method, linear sweep) to determine the threshold that would produce the desired number of 1s and 0s. Note that generally active surveying needs to operate once to find the positive threshold to produce the desired number of is and a second time to find the negative threshold to produce the desired number of 0s. As used herein, the positive threshold control $V_{thr+}$ corresponds to $V_{ctl}$ and represents the applied offset, e.g., to the PUF SRAM cell described in FIG. 1, that opposes the underlying offset of the PUF cell.

There are several security implications associated with surveying. Because surveying is typically done only during product test, its cost in power and execution time are of little importance. That means that it would be attractive to do it entirely in software, which would avoid hardware costs entirely. However, doing all of surveying in software necessarily implies that the computer doing the job can access the data in the PUF, at least during the time of enrollment. That means a connection (PUF output to computer) exists, which means that an attacker who can substitute different instructions during product test could substitute code which could, for example, upload the PUF contents to a file accessible to the attacker. Failing that, an attacker who can hack the system to allow access to the PUF data after enrollment could get the root key. Security would be enhanced if there were no connection between the PUF output and software accessible registers. Therefore it is preferable that at least the passive surveying step is done in hardware, not software.

In addition, the passive surveying should not make available high resolution partial results. For example, if one could choose to control the passive surveying to count for only J bits, where J is programmable to high resolution, an attacker who could obtain the results as a function of J would have strong information allowing accurate guessing of the root key. Generally there is no reason to allow such control since using all of the PUF would produce a lower raw BER.

So long as passive surveying is done in hardware, doing active surveying in software produces no security hazard. Note that hardware implementation of active surveying is also possible.

Differential Power Analysis (DPA) or simple power analysis (SPA) attacks are used to analyze power consumption patterns to obtain cryptographic information such as secret keys. DPA is based on examination of the difference between power traces obtained as a result of different messages. For the PUF, there is only one "message", so DPA cannot be applied. SPA is applicable but a less powerful technique. It will also be difficult for an SPA attack to be successful. Even with no countermeasures, successive reconstructions may produce a different power trace due to different errors occurring. An attacker cannot average. Each track is likely to be different but an attacker cannot average them. Surveying necessarily means placing thresholds in the "thick" portion of the pdf. A few percent of the bit cells will have offsets quite close to the thresholds so reading several thousand bits in the PUF array will result in ~100 bits which will be changing on each read trace. Further, there will be no_bit-serial operations. Read of a PUF array is likely to be 16, 32, or even 64 bits wide. Power consumption will have components based on the sum of the changes across many random bits. This transformation of the data dependent power results in little information for the attacker. Counter measures against SPA include avoiding return-to-zero operation of the PUF internal data bus. Return to zero means power consumption (for bus driving) is proportional to the number of 1s in the bus. Far less information is present if power consumption is proportional to the number of transitions on a wide bus. Another potential countermeasure is to start reading a full PUF array at a random address (different each time) during reconstruction. Thus, if you start reading the PUF array at address N, the read operation wraps around to address N−1 or at least until all the locations containing the strong 1s and 0s have been read. The integrated circuit containing the PUF may further include a random address generator (e.g. a true random number generator (TRNG)) in such an embodiment. The weak cells of the PUF may also be used to seed the random address generator or otherwise be used to determine the random address.

Figure 10A:
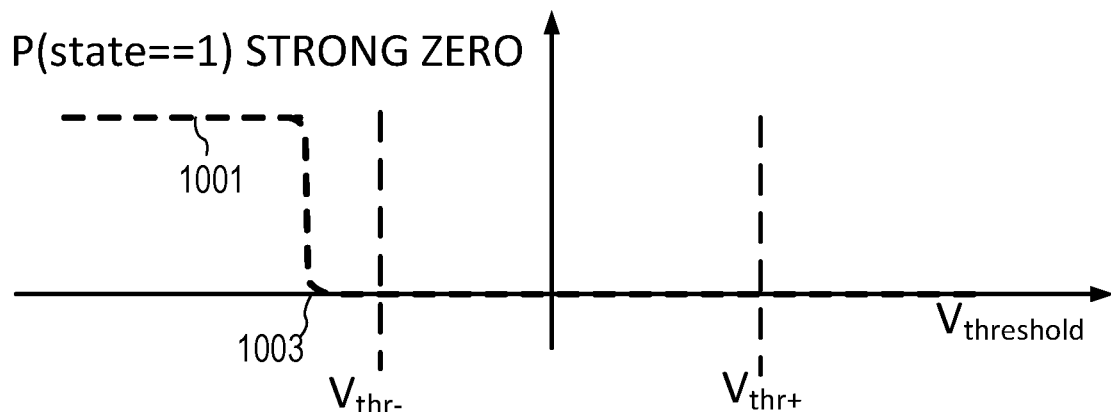
FIG. 10A illustrates the probability of obtaining a "1" for an applied threshold for a bit cell that is a strong zero.
Figure 10B:
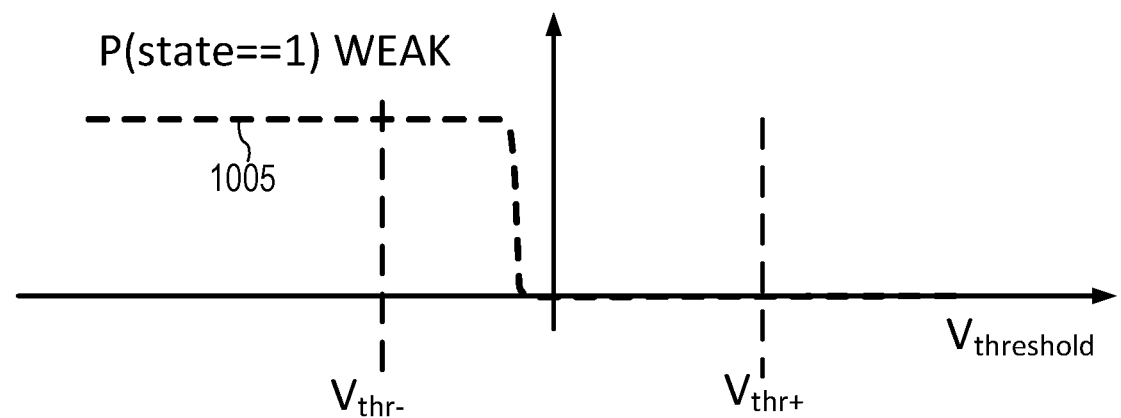
FIG. 10B illustrates the probability of obtaining a "1" for an applied threshold for a bit cell that is weak.
Figure 10C:
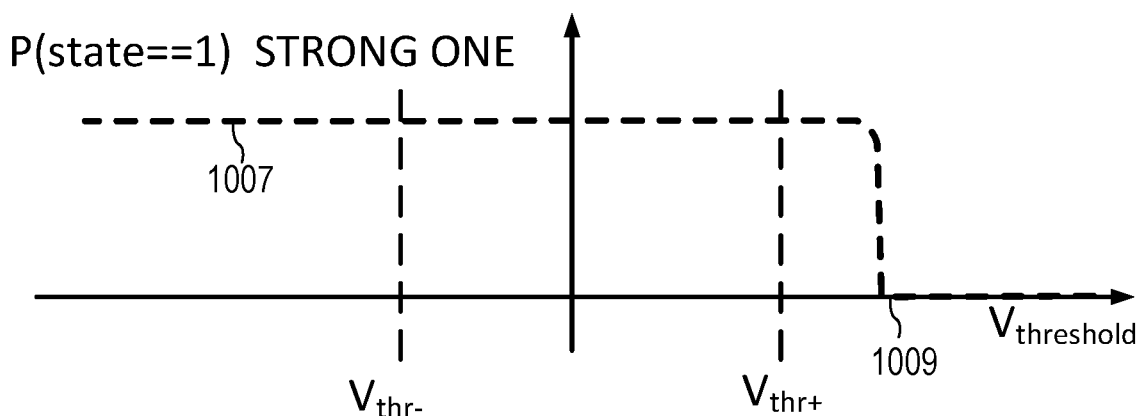
FIG. 10C illustrates the probability of obtaining a "1" for an applied threshold for a bit cell that is a strong one.

FIGS. 10A-10C illustrate the probability of obtaining a "1" for an applied threshold for bit cells that are respectively, strong zeros, weak cells, and strong ones. Referring to FIG. 10A curve 1001 shows the probability of obtaining a "1" for a bit cell that is a strong zero. With a sufficiently negative threshold ($V_{thr-}$) (opposing the natural offset that absent additional bias would result in the probability of a one goes to 100% at 1003. Curve 1005 in FIG. 10B shows the probability of obtaining a "1" for a weak cell at various offset levels. The probability of obtaining a "1" is zero for the weak cell represented when Vthr is positive and shifts to 100% when Vthr is slightly negative. In FIG. 10C curve 1007 shows the curve for a cell that is a strong one. The probability of obtaining a "1" is 100% until the positive threshold ($V_{thr+}$) reaches 1009 and overcomes the underlying offset of the strong cell, where $V_{threshold}$ corresponds to $V_{control}$ in: sign($V_{os}$ V+$_{noise}$−$V_{control}$). Eventually, at 1009, Vthr is so large it overcomes any potential $V_{os}$ that would otherwise cause the cell to read a "1".

One approach to determine strong and weak cells suitable for surveying reads the PUF bit cells at a positive threshold to determine those cells that are strong "1" and a negative threshold to determine those cells that are a strong "0". If the positive threshold $V_{thr+}$ is applied and the result of reading the cell is one (FIG. 10C), that indicates a strong "1", and otherwise the strong or weak status of the bit cell remains unknown. If the negative threshold ($V_{thr-}$) is applied and the result is 0 (FIG. 10B), that indicates a strong "0" and otherwise the strong or weak status of the bit cell remains unknown. The weak bits would be all those bits that were not strong. A survey operation using this approach, applies the positive threshold, reads the entire PUF, and counts all of the strong 1s. Then, the survey operation applies the negative threshold, reads the entire PUF, and counts all of the strong 0s. Of course, the order of determining strong is and strong 0s could be reversed.

Figure 11:
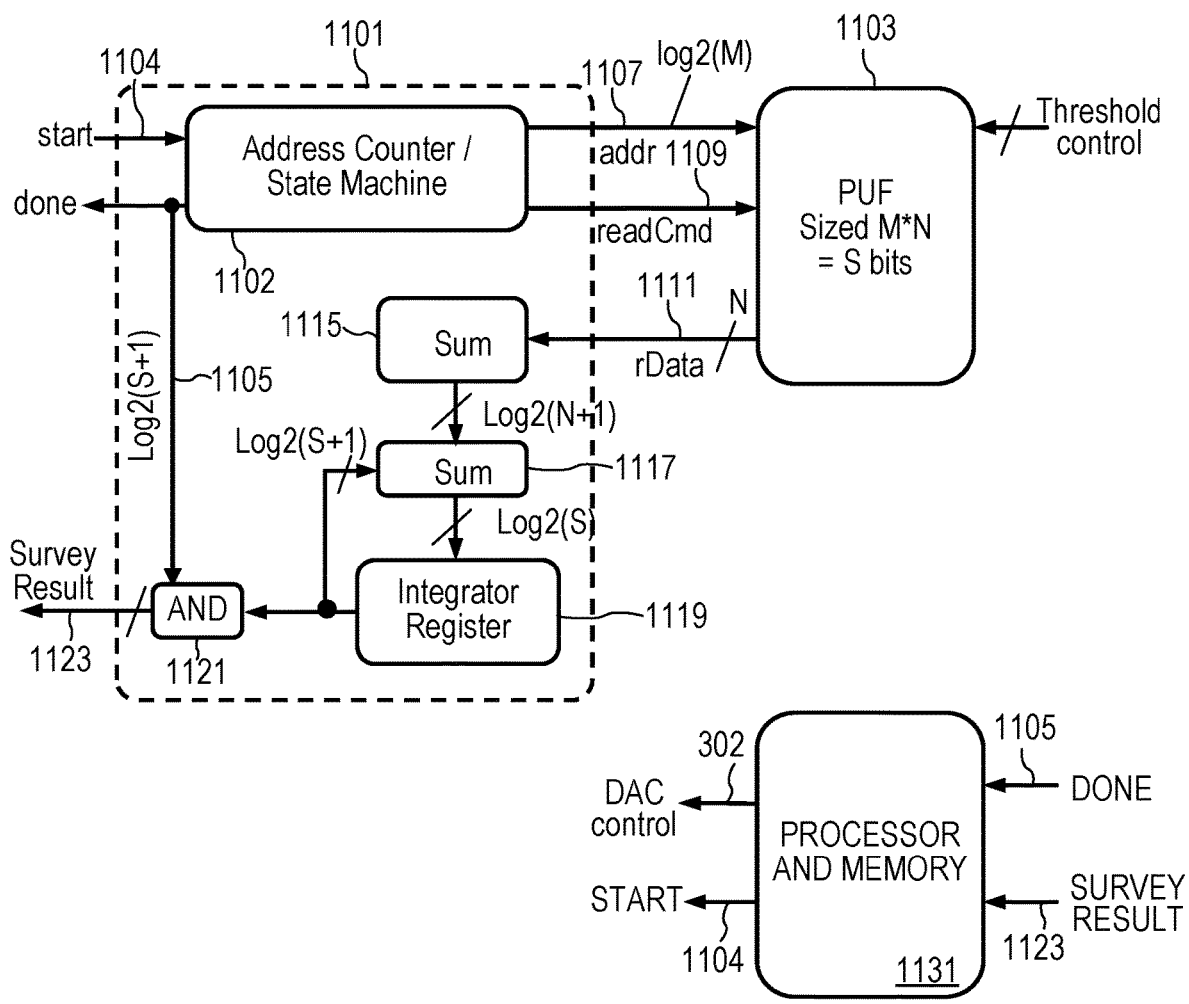
FIG. 11 illustrates an embodiment of a hardware implementation for passive surveying.

FIG. 11 illustrates an embodiment of a hardware implementation used for passive surveying. Here 'passive' means that the hardware just observes the PUF bit cells but does not change the threshold control. The passive surveying hardware 1101 includes an address counter/state machine 1102 that responds to a start command 1104 to direct the reading of all (or a portion thereof) of the words in the PUF 1103. The PUF 1103 is sized at M×N bits with a total of S bits, where M, N, and S are integers. The address counter/state machine provides the read address 1107 and read command 1109. The address counter/state machine provides a done signal 1105, when the read of the PUF 1103 is complete.

The passive surveying reads the PUF array 1103 a word at a time, and with the word size of N, the PUF 1103 supplies N bits of data on the read data bus 1111. The summer 1115 operates on the (N×1) independent binary bits supplied on bus 1111, adds up the total number of bits with a preselected state in the N bit word supplied and supplies that total number as a single word of size ceil(log 2(N+1)) to the second summer 1117. The preselected state may be a 0 or a 1. For example, with the size of the word N=32, the number of is in a single word is in the 0-32 range (inclusive), requiring 6 bits to represent the count value.

The second summer 1117 and register 1119 form an integrator which counts all of the 1s in the entire PUF 1103. The register 1119 supplies the final count value to a bank of AND gates 1121 and the bits of the final count value are ANDed with the done signal 1105 to reduce the data dependent power consumption for a smaller SPA attack surface. In other embodiments the AND gates 1121 are omitted. The Survey Result 1123 indicates the number of 1s resulting from reading S bits of the PUF at the specified threshold level. Of course, the number of 1s is indicative of the number of 0s since the number of 0s is (S-Survey Result), which can be readily determined in hardware or software. In an embodiment the passive survey circuit 1101 counts 0s instead of is and the number of 1s is then (S-Survey Result). In still other embodiments, the passive survey circuit 1101 is configurable to counts 0s or 1s. In such an embodiment, the passive survey circuit receives a control signal (not shown) to indicate whether to count 0s or 1s.

In an embodiment a processor, e.g., processor with associated memory 1131, such as a programmed microcontroller, controls the passive surveying hardware during active surveying. The processor supplies the DAC control values for the DAC to supply appropriate threshold values and the START signal 1104. The processor and memory 1131 receive the survey results and utilize the survey results as described further herein. The memory stores software to control the processor, stores DAC control values, and stores survey results. The memory is non-transitory computer readable media such as volatile or non-volatile memory.

The goal of active surveying is to find the threshold control pair that results in a preselected number of ones and a preselected number of zeros. Typically, the preselected number of 1s and 0s is the same. In practice of course, noise (e.g., from resolution of the DAC) ensures that repeated reads at the same applied threshold would yield some variability in the number of 1s and 0s obtained. Active surveying embodiments can be implemented in hardware or software utilizing processor and memory 1131 or embodiments can use both hardware and software. For each of the needed threshold controls (one threshold control for the number of ones, one for the number of zeros) an iterative search is done. Each step in the iterative search uses passive surveying to count the number of ones (or zeros) resulting from a particular choice of threshold control. Different embodiments implement the search in different ways. One embodiment uses a linear search that compares a preselected number to the number of bits in the preselected state in the survey result obtained at each threshold setting in a preselected range. Another embodiment uses a binary search across a preselected range. Binary searches are quick and easily implemented in hardware or software. Other search approaches, such as Newton's method can also be used.

Figure 12:
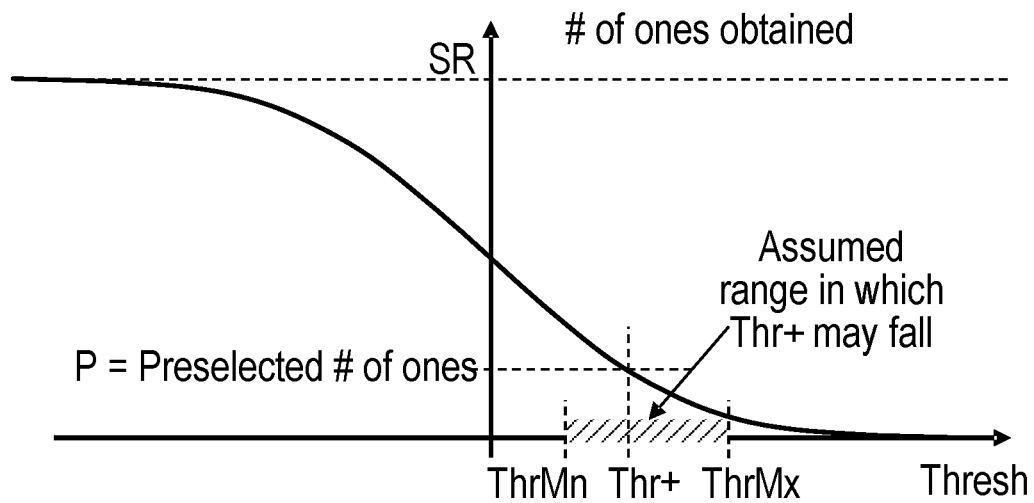
FIG. 12 shows a typical relationship between threshold setting and the passive surveying result.

FIG. 12 shows a typical relationship between threshold setting and the passive surveying result, SR. Thr+ corresponds to the positive threshold setting that results in the desired preselected number of ones. Thr+ falls in a range between the minimum threshold (ThrMn), which corresponds to a DAC setting of zero, and the maximum threshold (ThrMax), which corresponds to a DAC setting of $2^{K-1}$, where K is the number of bits of resolution in the DAC. The DAC may correspond to the DAC 301 shown in FIG. 3.

Figure 13:
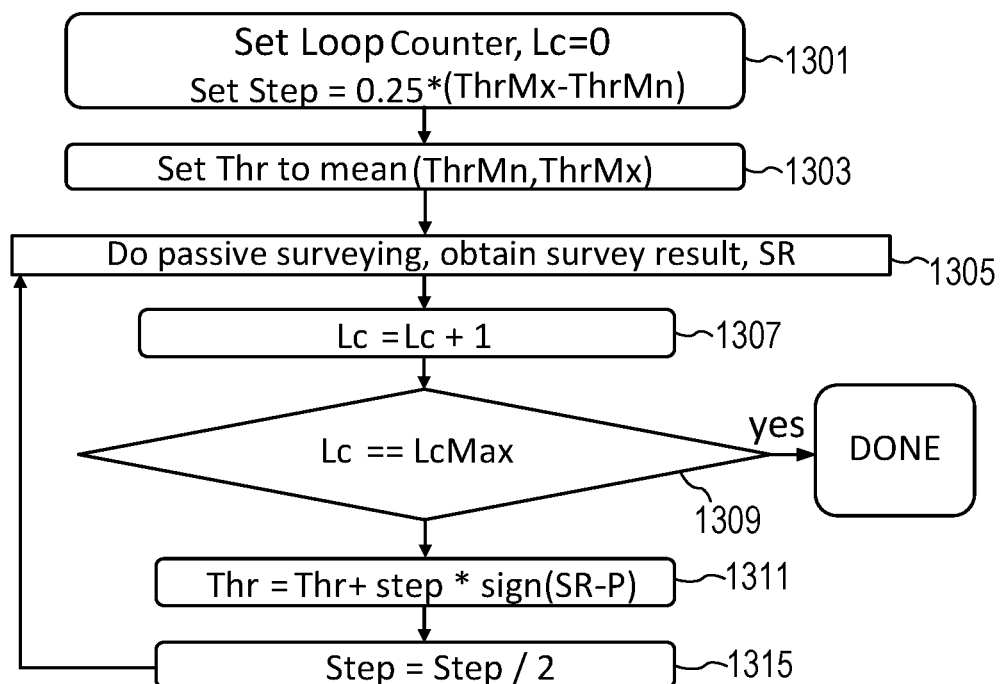
FIG. 13 illustrates a flow chart for the active surveying process.

FIG. 13 illustrates a flow chart for the active surveying process using a binary search to find Thr+. The flow may be implemented in software stored in memory and running on processor 1131 (see FIG. 11) or may be implemented in hardware. In 1301 the control software (or hardware) sets the loop counter to zero and sets the step value for the threshold increment. The control hardware or software in 1303 sets the current threshold to the mean of ThrMn and ThrMx. The active survey loop starts in 1305 by performing a passive survey with the current threshold to obtain the survey result SR. The passive surveying preferably uses hardware to implement the passive surveying such as the hardware illustrated in FIG. 11. The loop counter increments in 1307 and a check is made in 1309 to see if the loop counter has reached a maximum loop count. If the loop count has reached maximum, the active surveying is complete. Otherwise the current threshold value is adjusted by the step in a direction determined by the sign of (SR−P) in 1311, where P is the predetermined number of is desired. In other words, if the survey results SR (number of bits in the preselected state) are greater than the desired preselected number of bits P, the positive threshold $V_{thr+}$ is increased and if the preselected number is greater than the survey results, the positive threshold is decreased. If SR=P, the sign of 0 is defined as 1, −1, or 0 according to the particular implementation. The step size is halved in 1315 and the flow returns to 1305 to perform passive surveying with the updated threshold value. Once the active surveying is complete, the microcontroller evaluates the passive survey results SR to determine the positive threshold that provided the desired number P of 1s. Note that the positive threshold selected typically provides a number of 1s closest to P rather than an exact match to P.

Figure 14:
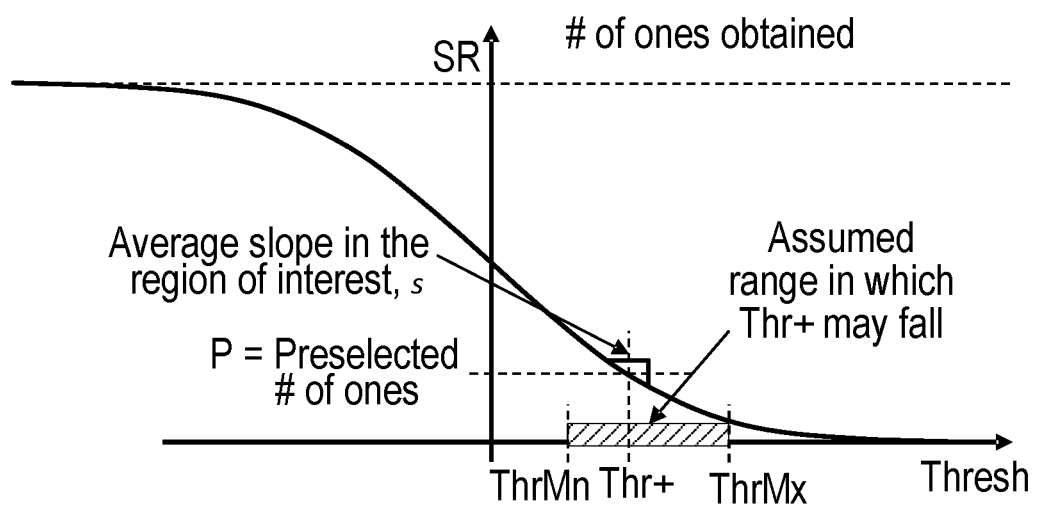
FIG. 14 illustrates an alternate search technique that approximates Newton's method.

FIG. 14 illustrates an alternate search technique that approximates Newton's method. In Newton's method, iterative surveying is done with the update equation:

$$Thr_n = Thr_{n-1} - \frac{SR - P}{s},$$

where Thr, SR, P are used as described in association with FIG. 14. The term s in FIG. 14 is the assumed mean derivative (slope) of SR as a function of Thr in the region of interest. Note that the classical Newton's method uses the actual derivative rather than an assumed mean value. Using a fixed value allows the division function to be a simple fixed multiplicative scaling. Assuming that s is in error by no more than −25% to +25%, each step reduces the error by 4×, and only a few steps would be required.

Because noise is present during the surveying, PUF bit cells which have thresholds close to the current Thr value produce a result which is not deterministic. The total count, SR, would have some distribution around its mean value. In order to reduce errors caused by the noise, averaging of the survey results, or accumulating the survey results across multiple reads of each PUF cell could be done. Averaging can be approximated with additional steps using smaller and smaller adjustments: {0.5×, 0.5×, 0.25×, 0.25×, 0.25×, 0.25×, 0.125×, . . . }.

Passive surveying is repeated to determine the Thr− value to complete determination of the threshold control pair that results in a preselected number of ones and a preselected number of zeros. In an embodiment, after obtaining the positive threshold that provides SR=P (or substantially equal to P), the SR results are used as the P number for determining the negative threshold. The pair of threshold control values determined are stored, e.g., in the helper data and used during reconstruction. In an embodiment, the mean of the positive and negative thresholds (or a rounded version of the mean suitable for the DAC) is used as the threshold during reconstruction.

Once the active surveying is complete, the threshold values are used during enrollment. The enrollment process uses the pair of threshold values determined during the active surveying. During enrollment, the locations of a sufficient number of strong bits (1s and 0s) are stored in a mask in the helper data so the locations of the same strong bits can be used during reconstruction. For example, the helper data may store the locations in the PUF array of approximately 3000 strong bits split approximately between strong 1s and strong 0s. The number of PUF bits stored depends on the level of coding required. The PUF bit cells are logically combined with secret data, e.g., a 256 bit root key supplied by a true random number generator (or another source with sufficient entropy) in a manner such that the root key can be reliably reproduced during the reconstruction phase. Thus, the helper data includes the PUF mask identifying the location of the strong bits needed for reconstruction, the mean of the threshold values $V_{thr+}$ and $V_{thr-}$ (or the threshold values themselves), and sufficient coding to reliably reconstruct the root key. For example, the coding may include repetition codes in which a number of PUF bits, e.g., 7 bits, are XORed with a bit of the secret data (the root key). The results of that operation are stored in the helper data. During reconstruction, the same PUF bits are XORed with the 7 bits of stored information to recover the one bit of secret data. Ideally, the 7 bits resulting from the XOR during reconstruction agree as to whether the secret bit is a one or zero, but if there is disagreement, a voting mechanism may be used to select the majority 4, 5, or 6 results that match. Additional coding such as various Hamming codes may be used and stored in the helper data to further reduce the error rate to an acceptable level to reconstruct the root key. The level of coding in the helper data may depend on the strength of the strong 1s and 0s. The stronger the 1s and 0s, the lower the error rate, and less coding may be needed to reliably produce the root key.

Thus, a PUF bit cell has been described and a PUF array formed by the PUF bit cells in which digital control is used to adjust the likelihood of getting binary ones or zeros as the result of reading an addressed word of bit cells in the PUF. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A physically unclonable function (PUF), comprising:
   a first bit cell including,
      a latch;
      a switch to selectively couple the latch to a supply voltage node;
      a first transmission gate coupled between a first bit line and a first internal node of the latch and a second transmission gate coupled between a second bit line and a second internal node of the latch;
   a digital to analog converter (DAC) circuit having a first DAC output selectively coupled to the first internal node through the first bit line and the first transmission gate and having a second DAC output selectively coupled to the second internal node through the second bit line and the second transmission gate, to precharge the latch before the first bit cell is read, the latch being precharged with the latch decoupled from the supply voltage node;
   wherein after the precharge of the latch, the first and second bit lines are disconnected from the first and second internal nodes by turning off the first and second transmission gates and the first bit line and the second bit line are precharged to a predetermined voltage level;
   wherein after the first and second bit lines are precharged to the predetermined voltage level, the latch is coupled to the supply voltage node to cause the first bit cell to regenerate; and
   wherein after the first bit cell regenerates, the first and second internal nodes are respectively coupled to the first and second bit lines to read a value of the latch.

2. The physically unclonable function as recited in claim 1 wherein the latch is a four transistor latch.

3. The physically unclonable function as recited in claim 1 wherein the supply voltage node is a ground node.

4. The physically unclonable function as recited in claim 1 further comprising:
   a bit line termination circuit selectively coupling the first and second bit lines to the DAC circuit according to a control signal.

5. The physically unclonable function as recited in claim 4, wherein the bit line termination circuit further comprises:
a first termination switch to selectively set the first bit line to a predetermined voltage and a second termination switch to selectively set the second bit line to the predetermined voltage.

6. The physically unclonable function as recited in claim 4, wherein the bit line termination circuit further comprises:
a tristate driver coupled to the first bit line, the tristate driver to supply a data out signal corresponding to a read value of the latch.

7. The physically unclonable function as recited in claim 4, further comprising:
a first PUF page including,
an array of bit cells including the first bit cell;
a first plurality of the array of bit cells disposed in a first column of the array, each bit cell in the first column being coupled to the first and second bit lines, the first plurality of the array of bit cells including the first bit cell; and
a second plurality of the array of bit cells in a first row of the array, the first row including the first bit cell, each bit cell in the first row being coupled to a first row signal that selectively activates the first and second transmission gates and a second row signal that selectively controls the switch to couple the latch to the supply voltage node.

8. The physically unclonable function as recited in claim 7 further comprising:
a plurality of pairs of bit lines coupled to the array of bit cells;
wherein each of the second plurality of the array of bit cells in the first row is coupled to a different pair of the plurality of pairs of bit lines; and
the DAC circuit is coupled to the plurality of pairs of bit lines.

9. The physically unclonable function as recited in claim 7 further comprising:
a plurality of PUF pages including the first PUF page; and
a memory controller to control access to bit cells of the plurality of PUF pages.

10. The physically unclonable function as recited in claim 1 wherein,
in a disabled state, the first bit cell is placed in a high impedance state by disconnecting the supply voltage node using the switch and the first and second internal nodes are coupled to the first and second bit lines through the first and second transmission gates to thereby couple the first and second internal nodes to a predetermined logic state.

11. A method for performing a read operation of a bit cell in a physically unclonable function (PUF), the read operation comprising:
precharging a latch in the bit cell with the latch decoupled from a supply voltage node, the precharging including coupling a first output of a digital to analog converter (DAC) circuit to a first internal node in a latch of the bit cell through a first bit line and a first transmission gate and coupling a second output of the DAC circuit to a second internal node in the latch through a second bit line and a second transmission gate;
disconnecting the first and second bit lines from the first and second internal nodes after allowing for a settling time for the precharge of the bit cell;
precharging the first bit line and the second bit line to a predetermined voltage level after the settling time with the first and second bit lines disconnected from the first and second internal nodes;
after precharging the first and second bit lines, coupling the latch to the supply voltage node to cause the bit cell to regenerate; and
reading a value of the latch using at least one of the first and second bit lines.

12. The method as recited in claim 11 further comprising disconnecting the DAC circuit from the first and second bit lines before precharging the first and second bit lines.

13. The method as recited in claim 12 further comprising disabling the DAC after disconnecting the DAC from the first and second bit lines.

14. The method as recited in claim 11 wherein the supply voltage node is a ground node.

15. The method as recited in claim 11, wherein the predetermined voltage level is ground.

16. The method as recited in claim 11, further comprising:
supplying a data out signal corresponding to the value of the latch to a tristate driver from at least one of the first and second bit lines; and
supplying the data out signal from the tristate driver.

17. The method as recited in claim 11 further comprising:
in a disabled state, disconnecting the latch in the bit cell from the supply voltage node, and coupling the first and second internal nodes to the first and second bit lines through the first and second transmission gates, the first and second bit lines being coupled to a voltage node having a predetermined voltage in the disabled state.

18. A method, comprising:
precharging a latch in a bit cell of a physically unclonable function (PUF) using a differential voltage applied to first and second bit lines with the latch decoupled from a supply voltage node;
after precharging the latch, precharging the first and second bit lines while the first and second bit lines are disconnected from the latch;
causing the latch to regenerate by coupling the latch to the supply voltage node; and
reading a value of the latch using at least one of the first and second bit lines.

19. The method as recited in claim 18 further comprising:
in a disabled state, disconnecting the latch in the bit cell from the supply voltage node and coupling first and second internal nodes in the latch to the first and second bit lines through first and second transmission gates, the first and second bit lines being coupled to a predetermined voltage in the disabled state.

* * * * *